United States Patent [19]

Min

[11] Patent Number: 5,620,150
[45] Date of Patent: Apr. 15, 1997

[54] TENSION SERVO APPARATUS FOR MAGNETIC TAPE

[75] Inventor: Young-hoon Min, Anyang, Rep. of Korea

[73] Assignee: Samsung Electronics Co., Ltd., Kyungki-do, Rep. of Korea

[21] Appl. No.: 600,152

[22] Filed: Feb. 12, 1996

Related U.S. Application Data

[63] Continuation of Ser. No. 240,529, May 10, 1994, abandoned.

[30] Foreign Application Priority Data

May 12, 1993 [KR] Rep. of Korea .................... 1993-8114

[51] Int. Cl.⁶ ......................... G11B 15/46; G11B 23/42; B65H 59/38; B65H 23/188
[52] U.S. Cl. .................... 242/334; 242/419.5; 360/71
[58] Field of Search ........................ 242/419.5, 419.9, 242/334; 360/83, 90, 71

[56] References Cited

U.S. PATENT DOCUMENTS

| | | | |
|---|---|---|---|
| 2,099,376 | 11/1937 | Shapiro | 242/419.9 X |
| 2,313,618 | 3/1943 | Bridges | 242/419.9 A |
| 2,640,663 | 6/1953 | Leland | 242/419.9 A |
| 3,386,679 | 6/1968 | Fonlon et al. | 242/419.5 |
| 4,020,998 | 5/1977 | Carbonell et al. | 242/419.5 X |
| 4,228,972 | 10/1980 | Koppensteiner | 242/419.9 X |

Primary Examiner—John Q. Nguyen
Attorney, Agent, or Firm—Sughrue, Mion, Zinn, Macpeak & Seas

[57] ABSTRACT

An apparatus for adjusting tension of a magnetic tape includes a clutch roller, which rotates in contact with one side of the tape and has a friction torque of a predetermined amount, and a low friction roller, which rotates in close contact to the other side of the tape, between a supply reel for feeding the tape and a drum. Accordingly, the tape tension servo apparatus can be more simply constructed. A constant tape tension can be always maintained irrespective of the rotation variation of the supply reel and an amount of the remaining tape.

4 Claims, 2 Drawing Sheets

TENSION SERVO APPARATUS FOR MAGNETIC TAPE

This is a Continuation of application Ser. No. 08/240,529 filed May 10, 1994, abandoned.

BACKGROUND OF THE INVENTION

The present invention relates to an apparatus for constantly maintaining tension on a magnetic tape in a magnetic recording and reproducing system, such as a video tape recorder, a camcorder, a digital audio tape recorder or the like, and more particularly to a tension servo apparatus having a simple construction for maintaining constant tape tension irrespective of the rotation variation of a supply reel the amount of the amount of tape remaining on the supply reel.

Generally, in magnetic recording and reproducing systems, it is very important to maintain the proper tension on the travelling tape to obtain good product performance. The conventional tape tension servo apparatus combines a band-brake which is wound in the supply reel, a tension arm, a tension pole and a pull spring, to automatically maintain the tension of the tape which runs around a drum.

In FIG. 1, which shows a conventional tape tension servo apparatus, a tape 11 travels toward a drum 14 through a tension pole 13 from a supply reel 12. Although not shown, it is well known that the tape winds around a portion of the drum 14, which has a record/read head therein, and is led via rollers, etc. back to a take up reel.

When the tape tension is above predetermined level, the tape will push tension pole 13 to the right, as shown in the drawing. A tension arm 15, to which tension pole 13 is attached at one end thereof, will rotate clockwise about pin 17 against the force of pull spring 16, increasing the restoring force of spring 16. As a result, a band-brake 18 loosens around the supply reel 12 permitting the supply reel 12 rotate smoothly. As the tape 11 is smoothly released from supply reel 12, the tension on the tape is gradually diminished.

On the other hand, if the tension on the tape 11 is below a predetermined level, the tension arm 15 is rotated counterclockwise due to the force of pull spring 16, causing band-brake 18 to tighten around the supply reel 12 to increase the tape tension.

By the above method, the tension pole 13 is rotated to the left or right according to a amount of tension on the tape, to always maintain the proper tension.

However, the tape tension will vary depending upon the rotation variation of the supply reel, external disturbances, and component clearances. Also, the tape tension will vary depending upon the amount of residual tape wound on the supply reel. In addition, the tension servo control is varied according to the spring constant of the pull spring. Thus, to minimize such variations in the tape tension, it is necessary to provide precision components. For example, the pull spring must be optimally designed, and an electronic actuator and reel motor are used to adjust the tension. However, even so, it is difficult to maintain uniform tape tension, and it is very difficult to provide a compact tape tension servo apparatus.

U.S. Pat. No. 4,133,494 to Mitaka discloses a prior art system for maintaining a uniform tension on a tape. In Mitaka, the system, which includes a known tension servo apparatus using a spring, also uses a circuit for detecting the speed of a servo motor or a guide roller and for adjusting the speed of the servo motor and a reel motor.

SUMMARY OF THE INVENTION

Therefore, to solve the above problems, it is an object of the present invention to provide a tape tension servo apparatus for use in a magnetic recording and reproducing system, not only for maintaining constant tape tension irrespective of the rotation variation of a supply reel, the component clearance and an amount of the remaining tape, but which also has a simple construction.

To accomplish the above object of the present invention, there is provided a tension servo apparatus for adjusting the tension on a magnetic tape between a supply reel and a drum comprising: a clutch roller, which has a friction torque of a predetermined magnitude and is rotated in close contact to one side of the magnetic tape; and a low friction roller, which is rotated in close contact to the other side of the magnetic tape.

DETAILED DESCRIPTION OF THE PREFERRED EMBODIMENT

A preferred embodiment of the present invention will be described below in more detail with reference to the accompanying drawings.

Figure 1:
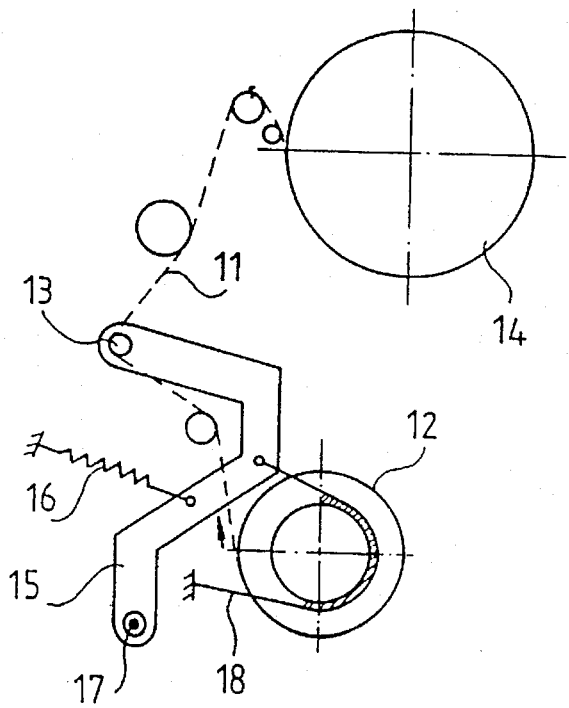
FIG. 1 is a view showing the construction of a conventional tape tension servo apparatus.
Figure 2:
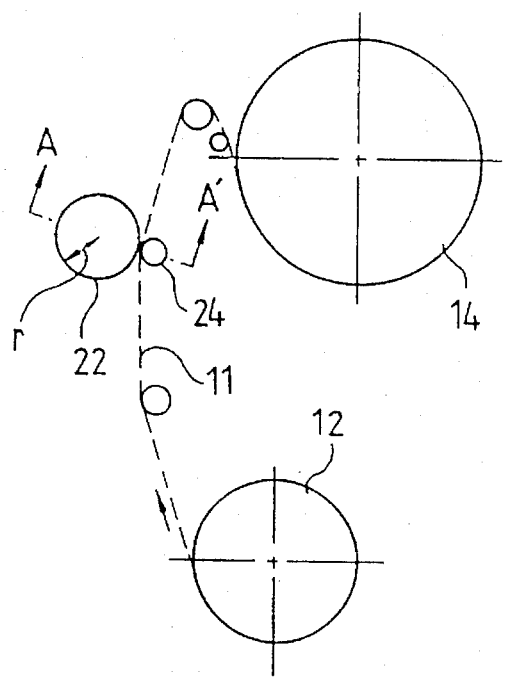
FIG. 2 is a view showing the construction of a tape tension servo apparatus according to a preferred embodiment of the present invention.

FIG. 2 shows a tape tension servo apparatus of the magnetic recording and reproducing system according to a preferred embodiment of the present invention. The FIG. 2 apparatus includes a clutch roller 22 and a low friction roller 24, instead of the elements of the conventional tension servo apparatus of FIG. 1. The low friction roller is one having near zero rotational friction. The tape travels between and is in contact with the rollers 22 and 24 as it travels from the supply reel 12 to the drum 14, and causes rotation of the clutch roller 22. The clutch roller 22 and friction roller 24 maintain a uniform tension on the tape, as will be described below with reference to FIG. 3.

Figure 3:
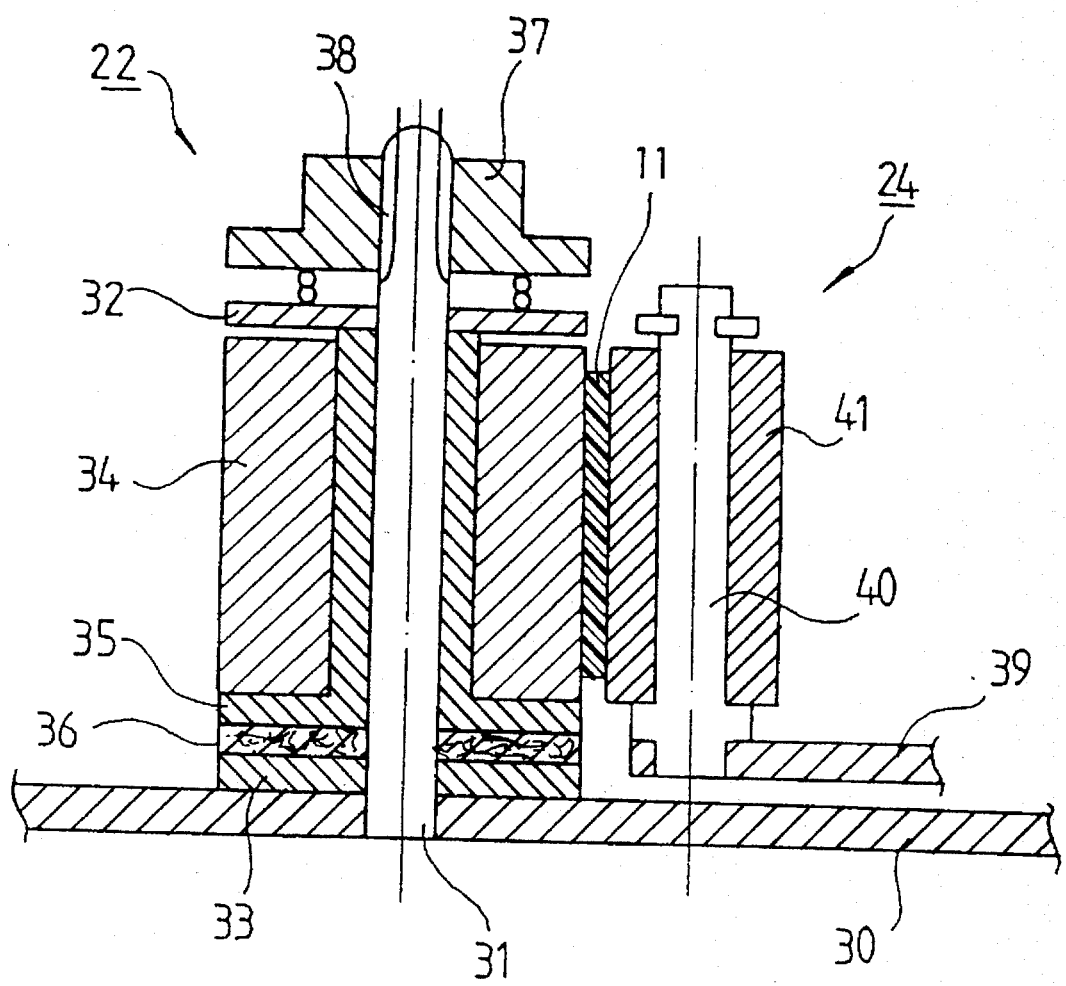
FIG. 3 is a cross-sectional view cut along a line A–A' of the FIG. 2 apparatus.

FIG. 3 is a cross-sectional view taken along a line A–A' of FIG. 2. Clutch roller 22, which is attached to a main chassis 30, includes a pin 31, an upper plate 32, a lower plate 33, a roller 34, a guide member 35, a felt member 36, and a cap 37. Low friction roller 24 includes a movable plate 39, a pin 40, and a roller 41. In the clutch roller 22, the roller 34, which contacts the tape 11, is fixed to guide member 35 and rotates about the pin 31. The felt member 36 is a friction member interposed between guide member 35 and lower plate 33, which is attached to main chassis 30. As a result friction force exists between the lower end of the guide member 35 and the upper end of felt 36. The tape is pressed between the roller 34 of clutch member 2 and the roller 41 of low friction roller 24. As the tape moves between these rollers it rotates the two rollers. However, the clutch roller is restrained by the frictional force between the felt member 36 and the guide member 35, thereby producing a tension on the tape 11. This friction force constantly maintains a tension on the tape 11. The tape tension can be represented by the following equation:

$T=\tau/r;$ where, T is the tape tension, r is the friction torque, and r is the radius of the clutch roller. Since the friction torque $\tau$ generated by felt 36 and the radius r of clutch roller 22 are constant, the tape tension T has a constant value. That is, the tape tension T is maintained at a uniform value irrespective of the rotation variation of the supply reel and an amount of tape remaining on the supply reel. If clutch roller 22 and low friction roller 24 are located as close as possible to supply reel 12, the tape tension before passing through the clutch roller can be close to zero. To obtain the clutch friction force, another friction member, such as magnet, etc., instead of the felt can be used.

The clutch roller also includes means for adjusting the friction and thereby adjusting the tension. The clutch roller 22 includes a threaded portion 38 on the upper part of pin 31 and a cap 37 which screws on the threaded portion of the pin 31. By rotating the cap, the friction force of clutch roller 22 can be increased or decreased. Tightening the cap pushes the guide member 35 harder against the felt member 36 to increase the friction, thereby causing the roller 34 to be more resistant to turning and increasing the tension on the tape 11. Thus, the amount of tape tension can be set as desired by manipulating cap 37.

As described above, the tape tension servo apparatus of the magnetic recording and reproducing system according to the present invention uses a clutch roller and a low friction roller instead of the elements used in the conventional tension servo. Accordingly, the tape tension servo apparatus not only has a simpler construction, but also maintain the tape at a constant tension irrespective of the rotation variation of the supply reel, the component clearance or the amount of tape remaining on the supply reel.

What is claimed is:

1. In combination with a magnetic recording and reproducing system including a main chassis having a supply reel and a drum mounted thereon, a tension servo apparatus which provides a tension on a magnetic tape passing between the supply reel and the drum, said tension servo apparatus comprising:

a clutch roller including a pin having one end fixedly mounted on the main chassis, a lower plate attached to the main chassis, a guide member rotatably mounted on said pin, a roller fixed to said guide member for rotation therewith and which contacts the magnetic tape, and a friction member interposed between said guide member and said lower plate and in contact with said guide member for generating a frictional force against the rotation of said roller; and a low friction roller positioned proximate to said clutch roller so as to press the magnetic tape between said low friction roller and said clutch roller such that as the magnetic tape travels the magnetic tape rotates said clutch roller, said clutch roller placing a tension on the magnetic tape as the magnetic tape passes between said clutch roller and said low friction roller, wherein said clutch roller further comprises:

a threaded portion on an opposite end of said pin extending beyond said roller and said guide member;

a cap threaded onto the threaded portion of said pin; and an upper plate interposed between said cap and said guide member and in contact with said guide member, whereby rotation of said cap in one direction so as to tighten said cap pushes said upper plate which in turn pushes said guide member against said friction member to increase the frictional force against the rotation of said roller, thereby increasing the tension on the magnetic tape, and whereby rotation of said cap in an opposite direction loosens said cap so as to decrease the frictional force and in turn decrease the tension on the magnetic tape.

2. The combination as claimed in claim 1, wherein said friction member is a felt pad.

3. The combination as claimed in claim 1, wherein said clutch roller is located in the proximity of said supply reel.

4. The combination as claimed in claim 1, wherein said tape tension is calculated according to the following equation:

$$\text{Tape Tension} = \frac{\text{Friction Torque}}{\text{Radius of Clutch Roller}}.$$

* * * * *